Oct. 9, 1934.    F. M. CRANDALL    1,976,543
AUTOMOBILE SIGNAL SYSTEM
Filed Jan. 7, 1931    2 Sheets-Sheet 1
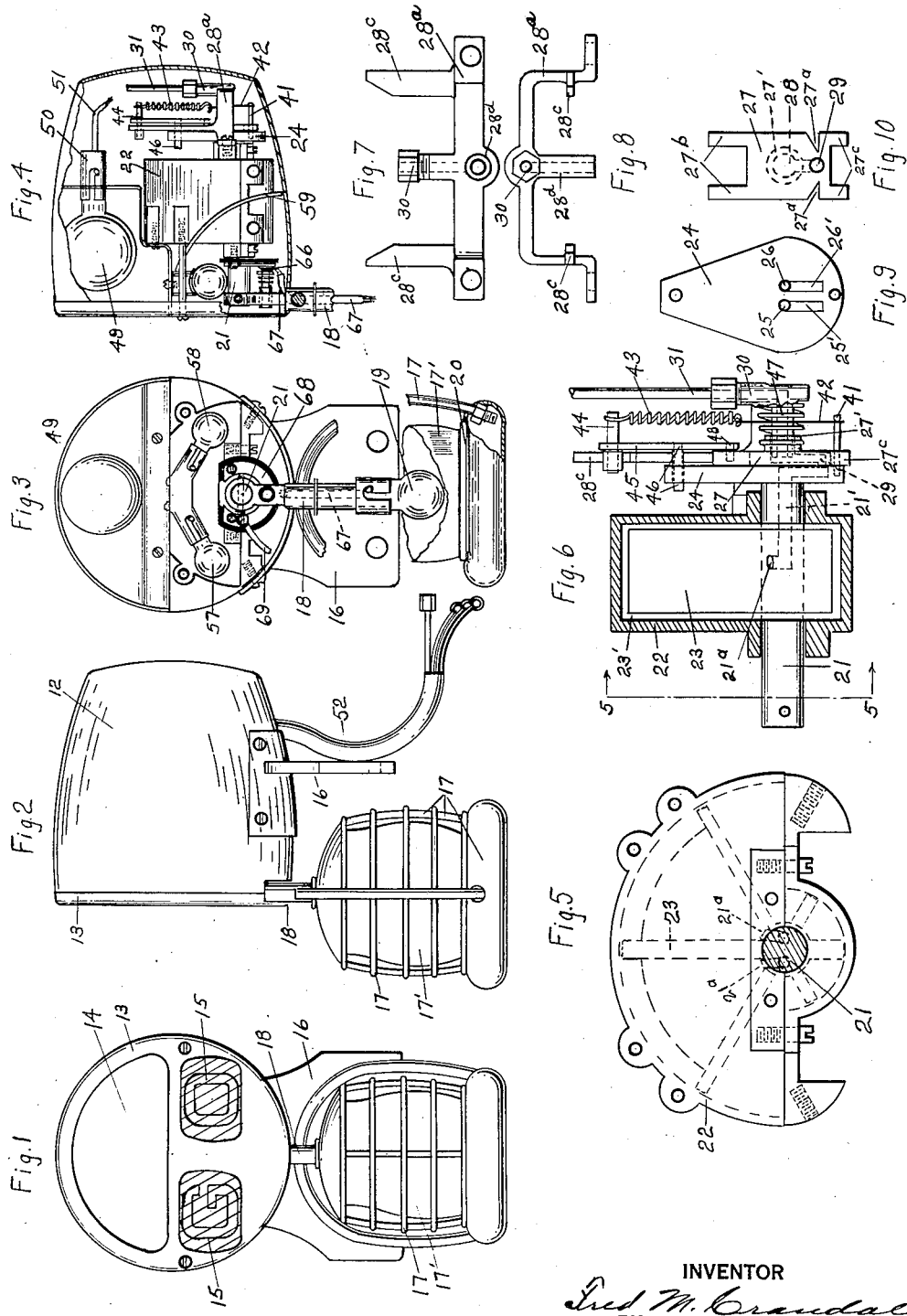
INVENTOR
Fred M. Crandall
BY
ATTORNEY Oct. 9, 1934.  F. M. CRANDALL  1,976,543
AUTOMOBILE SIGNAL SYSTEM
Filed Jan. 7, 1931   2 Sheets-Sheet 2
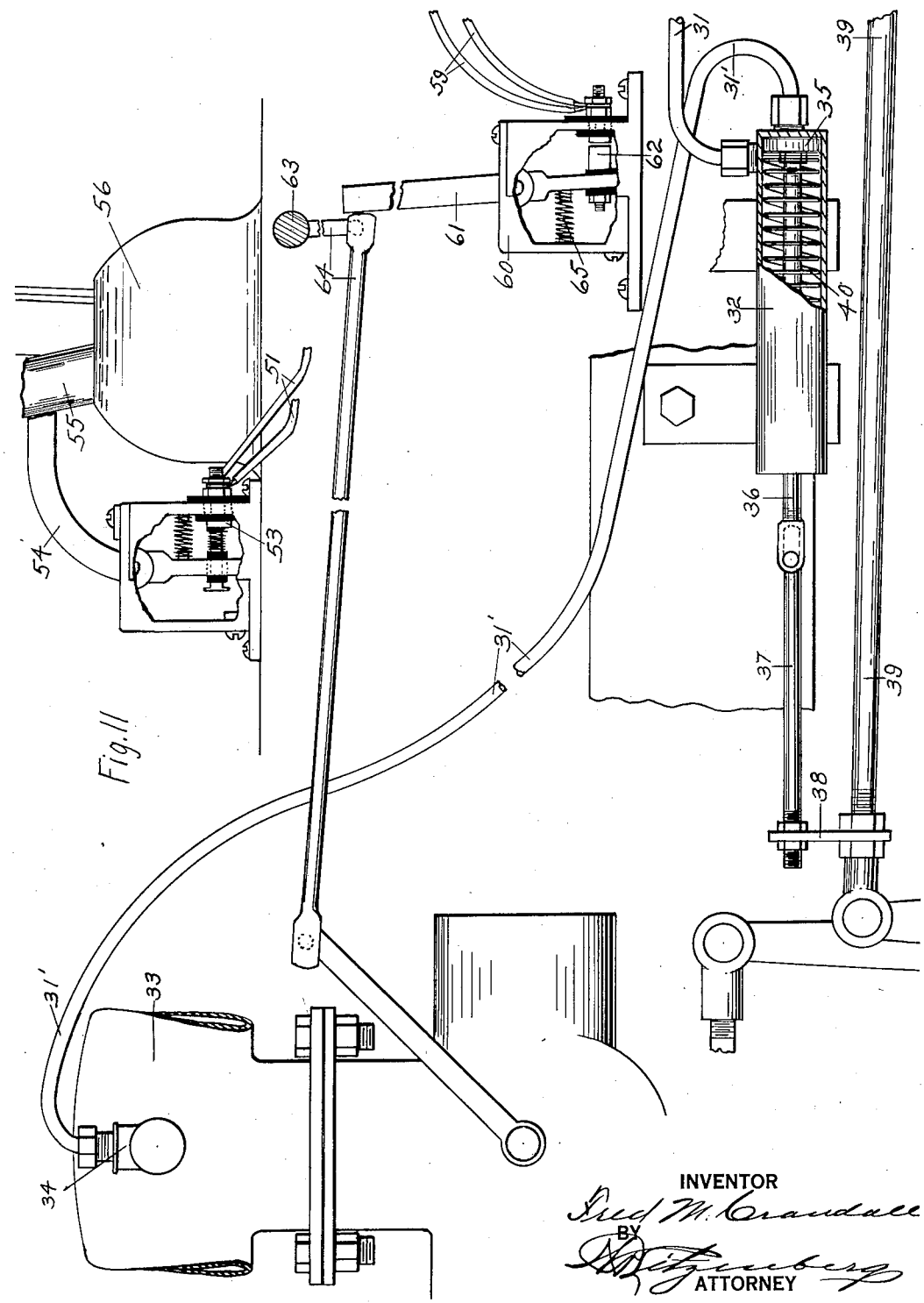
INVENTOR
Fred M. Crandall
BY
ATTORNEY Patented Oct. 9, 1934

1,976,543

UNITED STATES PATENT OFFICE 1,976,543

AUTOMOBILE SIGNAL SYSTEM

Fred M. Crandall, Los Angeles, Calif.

Application January 7, 1931, Serial No. 507,217

5 Claims. (Cl. 116—39)

My invention relates to a signal system for automobiles for the purpose of indicating the proposed action of the automobile carrying the signal system, and it has among its salient objects to provide a combination "stop" and "action" signal, all interconnected in one structure, with operating and control connections to the control members of the automobile on which it is mounted.

Other objects will be apparent from the following description thereof, taken in connection with the accompanying two sheets of drawings, in which—

Figure 1 is a front elevation of my signal;

Figure 2 is a side elevation thereof;

Figure 3 is a front view with the front of the case removed and with parts broken away to disclose the interior construction and arrangement;

Figure 4 is a side view with the side broken away to disclose the interior;

Figure 5 is an end elevation of a mechanism for swinging the "swinging" signal;

Figure 6 is a vertical sectional view through said mechanism, with controlling mechanism thereof in side elevation;

Figure 7 is a front view of a detail;

Figure 8 is a plan view of the same; and

Figures 9 and 10 are views of details;

Figure 11 is a diagrammatic view illustrating how the different parts of an automobile are connected with my signal system.

Referring now in detail to the drawings, Figs. 1 to 10 inclusive, my invention as here illustrated for descriptive purposes, comprises a housing or case 12, having a front 13, with signal windows 14 and 15 therein. A supporting bracket 16 is shown for attaching the signal to an automobile. Suspended to swing below said case 12, is a swinging "stop" signal 17, in the form of a lantern having a red globe 17', said swinging lantern being suspended from an arm 18, extended into the lantern and provided with lamp and lamp socket 19, to illuminate the red globe 17'. The bottom of said lantern signal member 17, is white glass 20, or it can be left open to throw a white light downwardly for the purpose of illuminating a license plate (not shown). This will be understood from Fig. 3. Said arm 18 is attached at its upper end to a shaft 21, which constitutes an operating shaft for said swinging signal lantern. Said shaft 21 is extended into a housing 22, Fig. 5, and Fig. 6, and is provided within said housing with a wing or vane 23, having around its edge a wiping, flexible border, as 23', which fits closely the interior walls of said housing 22, as it is moved back and forth therein, as will be indicated by the different positions shown in light broken lines in Fig. 5. The shaft 21, at its inner end is provided with two horizontally spaced bores, as 21', which terminate at their inner ends, out through the side of the shaft 21, at opposite sides of said wing or vane 23, one being shown at 21$^a$, Fig. 6. Mounted on the end of said shaft 21, is a plate 24, having two holes therein, designated 25 and 26, with channels 25' and 26' cut in the face of said plate 24, as seen in Fig. 9. Said plate 24 rocks with said shaft 21. The holes 25 and 26 register with the two bores 21' in the end of the shaft 21, while the channels 25' and 26' extend downwardly, as shown. Mounted against the face of said plate 24 is a valve plate or member 27, having on its outer face a boss 27', through which is a bore 28, into the plate 27, which bore, within the said plate 27, is downward and out at 29, as seen in Fig. 10, and also seen in light broken lines in Fig. 6. Attached to the side of the housing 22, around said plates 24 and 27, is a yoke member 28$^a$, Figs. 7 and 8, having a central sleeve or boss 28$^d$, the end of which fits into the boss 27' on the plate 27, as will be clear from Fig. 6. Said yoke also has a pipe connection 30, with which connects a pipe 31, which is extended to the manifold of the engine for the creation of suction intermittently through said pipe 31. Referring to Fig. 11, it will be seen that said pipe 31 is connected into the end of a valve case 32, with which is also connected a continuation pipe 31' from said case 32, to the manifold 33 of the motor, said connection being at 34. In said case 32 is a valve 35, with operating rod 36, connected by means of a link 37, and plate 38, to the brake-operating rod 39, so that when said brake rod is moved, it will also move said valve 35 and open communication between pipe 31 and pipe 31', through the end of said case 32. A spring 40 operates to move said valve 35 to its normal position, as shown.

Referring now to Fig. 10, it will be seen that the plate or member 27, is provided at its opposite sides with two notches, as 27$^a$, and at its opposite ends with cut-out portions to form the extension fingers 27$^b$ and 27$^c$, by means of which said plate 27 is rocked back and forth to alternately register its hole or port 29 with the channels 25' and 26' in the plate 24, and thus connect the passage from the pipe 31, coupling 30, and sleeve or tubular member 28$^d$, in the yoke 28$^a$, with the inside of the housing 22, through the shaft bores 21'. When said port 29, in the plate 27, is in register with one of the channels 25' or 26', one of the notches 27$^a$ is in register with the other channel to permit the inflow of air. Thus as suction is applied through one of the bores 21' to the housing 22, at one side of the wing or vane 23, air is admitted to the other side thereof and said wing or vane is moved, and as the suction is alternately applied to opposite sides of said vane, and air admitted to the opposite sides, said vane is caused to move back and forth, and inasmuch as it is rigid with shaft 21, said shaft is rocked, and rocks the arm 18, swinging the lantern signal 17 back and forth.

Projecting from the lower end of the plate 24, on the inner end of shaft 21, is a pin 41, to which is attached a wire 42, which is bent around one side of the boss 27', and is attached at its upper end to a small coiled spring 43, attached at its upper end to a pin 44, projecting from the upper end of an arm 45, pivotally supported on a pin 46 projecting from the upper end of the plate 24, as seen in Fig. 6. The yoke 28ª, it will be seen, has two upstanding stop fingers, 28ᶜ, 28ᶜ, only one of which is seen in Fig. 6, the other part of said yoke being broken away to show the bosses 27' and 29. A coiled spring 47, is shown around the telescoping bosses 27' and 28ᵈ, and this operates to yieldingly hold the rocking plate 27 against the plate 24 to prevent leakage. The arm 45, which is pivoted at 46, is provided with a pin 48, at its lower end, which pin moves between the fingers 27ᵇ in the upper end of the plate 27. This mechanism operates to alternately move said plate 27, which operates as a valve in switching the suction from one side of the vane 23 in the housing 22 to the other side of said vane. As the vane moves, the shaft 21 is rocked, thus rocking the plate 24, and through its pin 46, at its upper end, it moves the arm 45 in one direction or the other, and through the lower end of said arm, the valve plate 27 is rocked to change the port connection 29 with one or the other of the channels 25' or 26' in the plate 24, the fixed pin 41 in the lower end of said plate 24 operating as a stop for the fingers 27ᶜ at the lower end of said plate 27. The arm 45 also moves at its upper end, moving the pin 44, which supports the coiled spring 43, and this causes an accelerated movement of said arm 45 to one or the other of the stop fingers 28ᶜ projecting upwardly from the yoke 28ª, thus making sure of the movement of the valve plate 27 back and forth to change the suction from one side of the vane 23 to the other side thereof and causing the regular movement of said vane and shaft for moving the swinging lamp, as before described.

In the upper part of the signal case 12, is a lamp 49, in socket 50, with wires 51, extended therefrom out through a cable 52 from said housing 12. This lamp is connected with a switch 53 (Fig. 11) having a switch lever 54, extended up so that its free end is adjacent the shift lever 55 of the transmission mechanism 56, only part of which is indicated. When said shift lever is moved to back said car, it will engage and move said switch lever 54, closing the switch, and completing the circuit to the lamp 49 in the upper part of the housing 12, thus indicating that the car is to back.

Mounted in said housing, back of the "go" windows 15, 15, are two lamps, 57 and 58, from which wires 59 extend, and these wires are extended to and connect with a switch mechanism 60 (Fig. 11) and including a switch lever 61, operating contact 62, as shown. The switch lever 61 extends to a position adjacent the rock shaft 63, and its connection to the carbureter connection, designated as a whole 64, so that when the throttle lever is moved, said switch lever is released and a spring 65 moves said switch to closed position, closing the circuit through wires 59 and lighting the lamps 57 and 58, these lamps being connected into the regular lighting system, and being on when the lights are on.

The lamp 19, in the swinging lantern stop signal, is connected to a spring pressed contact element 66, by wires 67, Fig. 4, which contact element has a moving contact with a circular contact plate 68, with which are connected the wires for the tail light circuit 69. Thus the lamp 19, in said swinging lantern device, is lighted for use as a tail or rear light, within the red globe 17' of said lantern, and when said lantern swings through the connection with the suction of the manifold, it operates as a stop light, the contact being maintained while swinging.

Thus I have provided a very effective and certain signal system and which is automatically operated as the different control levers of an automobile are operated, whether it is the transmission lever moved to the back up position, as indicated in Fig. 11, or whether it is the brake mechanism, which is connected to open up communication between the manifold of the motor and the swinging lantern operating mechanism, or whether it is the accelerator or throttle lever. This is made possible by a simple self-contained switch which can be mounted bodily near the control lever with its switch lever projecting into the path of the operating or control lever of the automobile.

While I have shown and described one practical embodiment of my invention, I am aware that many changes can be made in the details of construction and arrangement thereof without departing from the spirit thereof, and I do not, therefore, limit my invention to the details shown, except as I may be limited by the hereto appended claims.

I claim:

1. A signal including in combination a case, a signal suspended close thereunder to swing back and forth, and means for swinging said signal including a shaft, a housing within said case, a vane on said shaft within said housing, said shaft having conduits therein from outside of said housing and emerging through said shaft at opposite sides of said vane, and means for connecting said conduits to the engine for creating suction alternately through said conduits for moving said vane, shaft and signal.

2. A signal of the character referred to including a case, a signal suspended close thereunder to swing back and forth, and means for swinging said signal including a housing within said case, a shaft therein from said signal, a vane on said shaft within said housing and fitting therein, said shaft having two conduits therethrough and emerging from the sides of said shaft at opposite sides of said vane, a plate on the end of said shaft and having ports therethrough in communication with said shaft conduits, a valve plate against the face of said plate and movable to alternately open passage to said conduits, and means connecting said conduits through said plates to the manifold of the engine for the purpose described.

3. In a signal for vehicles, a case, a signal member suspended close under said case to swing back and forth thereunder, and means for swinging said signal member including a housing, a shaft connected with said signal member and extending through said housing and having a vane thereon within said housing, said shaft having conduits extending longitudinally therethrough into said housing and emerging through the sides of said shaft at opposite sides of said vane, a valve mechanism at the end of said shaft for alternately opening and closing said conduits, and means connecting said conduits to the manifold of an engine, for the purpose described.

4. A signal of the character shown and described and including in combination a case, a signal member suspended close under the case to swing back and forth thereunder, and means for operating said signal member which includes a housing, a shaft extending from said member through said housing, a vane on said shaft and fitting within said housing to be moved back and forth to oscillate said shaft with a rotary oscillating movement to swing said lantern, conduits through said shaft longitudinally into said housing and emerging through the sides of the shaft at opposite sides of the said vane to alternately create suction in said housing at opposite sides of said vane, valve means connected with said shaft outside of said housing for alternately opening and closing said conduits, and means for connecting said conduits to a source of suction, substantially as described.

5. A signaling device of the character referred to including in combination a case, a signal member suspended under said case to swing pendulum fashion back and forth, means within said case for operating said signal member and including a shaft to which said signal member is connected, means for rocking said shaft on its longitudinal axis and moving said signal member therewith, said means including a vane on said shaft within said case to rock therewith, said vane being responsive to suction applied alternately to opposite sides thereof within said case, and means connected with the manifold of an engine and with said case for alternately applying suction to said case at opposite sides of said vane.

FRED M. CRANDALL.